United States Patent [19]

Creissels

[11] Patent Number: 4,619,206
[45] Date of Patent: Oct. 28, 1986

[54] DRIVE SYSTEM FOR A TWIN SUSPENSION HAULAGE CABLE GONDOLA LIFT

[76] Inventor: Denis Creissels, 43, Bld. des Alpes, 38240 Meylan, France

[21] Appl. No.: 654,657

[22] Filed: Sep. 26, 1984

[30] Foreign Application Priority Data

Oct. 3, 1983 [FR] France .............................. 83 15838

[51] Int. Cl.$^4$ ............................................. B61B 11/00
[52] U.S. Cl. .................................. 104/178; 192/4 R; 192/0.082; 74/665 R; 318/7; 318/99
[58] Field of Search .................... 104/178, 192, 173 R, 104/173 ST; 254/290, 293, 294, 317, 321; 192/0.082, 4 R, 0.098, 4 R; 74/665 R, 665 P, 665 L; 318/98, 99, 6, 7

[56] References Cited

U.S. PATENT DOCUMENTS

| | | | |
|---|---|---|---|
| 1,745,094 | 2/1926 | Hild | 318/99 |
| 2,168,777 | 8/1939 | McCreary | 104/178 |
| 2,586,412 | 2/1952 | Winchester, Jr. | 104/178 |
| 2,771,790 | 11/1956 | Munschauer | 192/0.098 |
| 3,688,167 | 8/1972 | Ivey et al. | 318/99 |
| 3,788,606 | 1/1974 | Solter | 254/290 |
| 3,991,349 | 11/1976 | Watson et al. | 318/100 |
| 4,100,822 | 7/1978 | Rosman | 104/178 |
| 4,377,222 | 3/1983 | Sommer | 192/0.098 |

FOREIGN PATENT DOCUMENTS

| | | |
|---|---|---|
| 905527 | 7/1972 | Canada . |
| 0015211 | 9/1980 | European Pat. Off. . |
| 517409 | 1/1930 | Fed. Rep. of Germany ...... 104/178 |
| 2518753 | 4/1976 | Fed. Rep. of Germany ...... 254/290 |
| 1249949 | 11/1960 | France . |
| 2448464 | 9/1980 | France . |
| 1078195 | 8/1967 | United Kingdom . |

Primary Examiner—Robert B. Reeves
Assistant Examiner—Dennis C. Rodgers
Attorney, Agent, or Firm—Parkhurst & Oliff

[57] ABSTRACT

The present invention relates to a gondola lift having two parallel suspension haulage cables between which the gondolas hang. The two cable loops extend between two stations and each cable is driven by a direct current electrical motor, the two motors being identical and having separate excitation circuits. The armature windings are connected to the same power supply source by two armature circuits including identical resistors which provide an armature voltage drop and a reduction in speed for restoring identical power outputs of the two motors when one of the cables is in advance. The mechanical connections between the cables and the motors include gear boxes, the high speed shafts therefrom being coupled by a control clutch.

3 Claims, 3 Drawing Figures

DRIVE SYSTEM FOR A TWIN SUSPENSION HAULAGE CABLE GONDOLA LIFT

CROSS-REFERENCE TO RELATED APPLICATION

Certain inventions related to those disclosed in the present application are disclosed and claimed in co-pending application Ser. No. 501,138, filed June 6, 1983 now U.S. Pat. No. 4,590,430 by Denis CREISSELS.

BACKGROUND OF THE INVENTION

The invention relates to a drive system for an overhead cable transport installation of the type having two cable loops between which gondolas hang. Such a gondola lift is described in the U.S. Pat. No. 4,590,430. Each gondola comprises at least one pair of detachable grips for connecting the gondola to both cables, in line, and for disconnecting the gondolas in the stations or terminals, by detachment of the grips to allow for passenger embarkation and debarkation at null or reduced speed.

It is essential that the two cables run in phase in order to prevent any slanting of the gondolas both in normal operation and at braking.

The object of the present invention is to provide a drive system which equalizes the tension in the two cables.

Another object is to provide an electrical self control motor power supply system which maintains identical power outputs of two direct current motors.

SUMMARY OF THE INVENTION

In accordance with the invention the two electrical direct current motors are connected to the same energy source. The circuits connecting the armature winding of the motors to this energy source each includes a resistor which provides a voltage drop RI, R being the electrical resistance of the resistor and I the current flowing in the circuit, particularly in the resistor and in the armature winding. A tension increase in one of said cables, due for instance to an advance of this cable, provokes a current I increase and consequently a voltage drop RI. The voltage applied to the armature winding decreases and the speed of the cable in advance is reduced so that the other cable takes over a greater part of the cable drive power. This electrical control system does not work when the motor current supply is interrupted during braking and it is clear that there is a finite amount of adjustment which may be made in this manner. In accordance with the invention the high speed shafts of the cable drive gear boxes are coupled together when the brakes are actuated. The mechanical coupling of these shafts achieves synchronous braking operation of both cables.

BRIEF DESCRIPTION OF THE DRAWINGS

The invention is described in detail with reference to the attached drawings wherein.

DETAILED DESCRIPTION OF THE PREFERRED EMBODIMENTS

Figure 1:
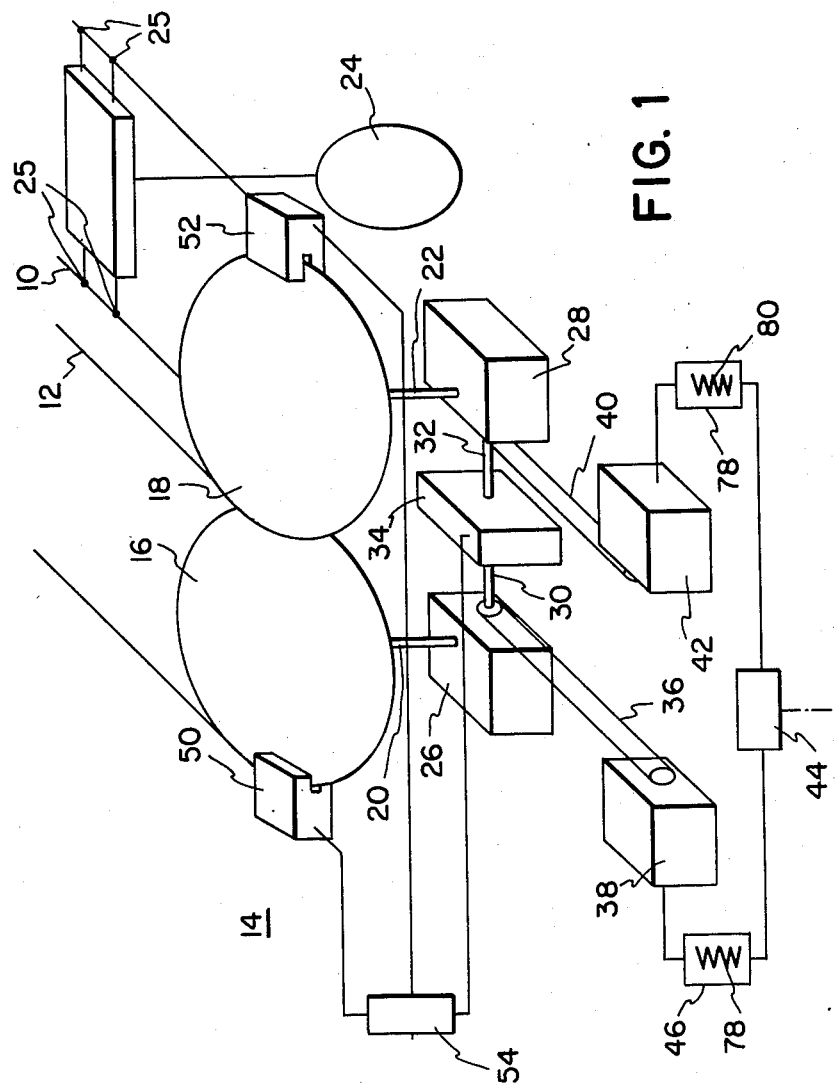
FIG. 1 is a schematic perspective view of a drive mechanism according to the invention.
Figure 3:
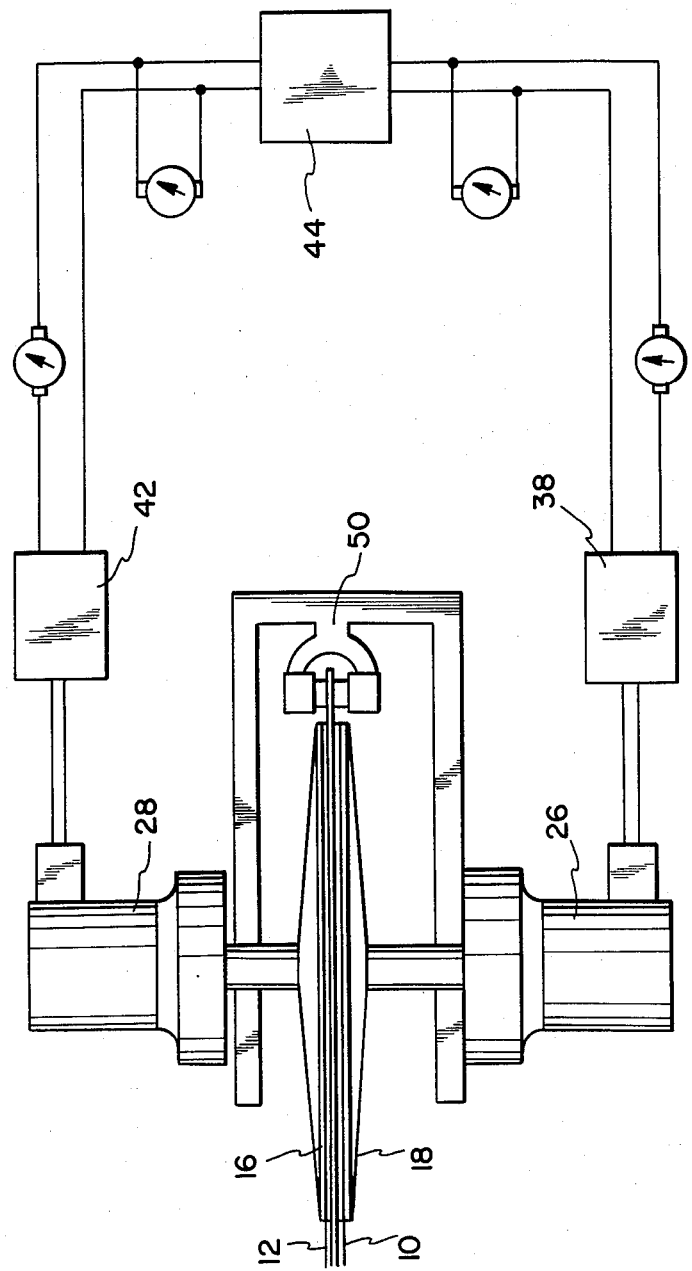
FIG. 3 is a front view of an alternative embodiment of the drive mechanism.

FIGS. 1 and 3 represent two gondola lift suspension haulage cables 10, 12 running in a closed loop circuit between two end terminals, only the drive terminal 14 being shown, when they pass over vertical sprindle 20, 22 end pulleys 16, 18. The end pulleys 16, 18 of terminal 14 drive the cables 10, 12 continuously and at the same speed. Each gondola 24 is coupled on line to the cables 10, 12, and may follow each other at close or longer intervals along the cables 10, 12. On entering the terminals the gondolas 24 are uncoupled from cables 10, 12 and are taken over on transfer rails running along the embarkation and debarkation platforms (not shown). Passengers board and leave the gondolas at null or reduced speed. At the terminal exit the gondolas are accelerated by any appropriate means before being connected again to the cables 10, 12 on the opposite line. This type of operation of gondola lifts is well known.

The suspension haulage cables 10, 12 run parallel and at the same height in line, their constant clearance from each other being about 75 cm.

The axles 20, 22 of the pulleys 16, 18 are connected to the low speed shafts of two speed reducing gear boxes 26, 28 the high speed shafts 30, 32 of these boxes being mechanically coupled together by means of a clutch device 34. The shaft 30 is driven by an electric motor 38 by means of a belt transmission 36 while the shaft 32 is driven by an electric motor 42 by means of a belt transmission 40. The two drive mechanisms are identical and the two motors 38, 42 are connected to the same power supply 44 through control units 46, 48 described thereafter.

The braking device comprises a braking clamp 50 for braking pulley 16 and a braking clamp 52 for pulley 18 and a control unit 54 which electrically or hydraulically actuates the two pulley brakes and the clutch 34 so as to couple together rigidly the two high speed shafts 30, 32 when the brakes of the pulleys are applied. The brakes may be of another type.

Figure 2:
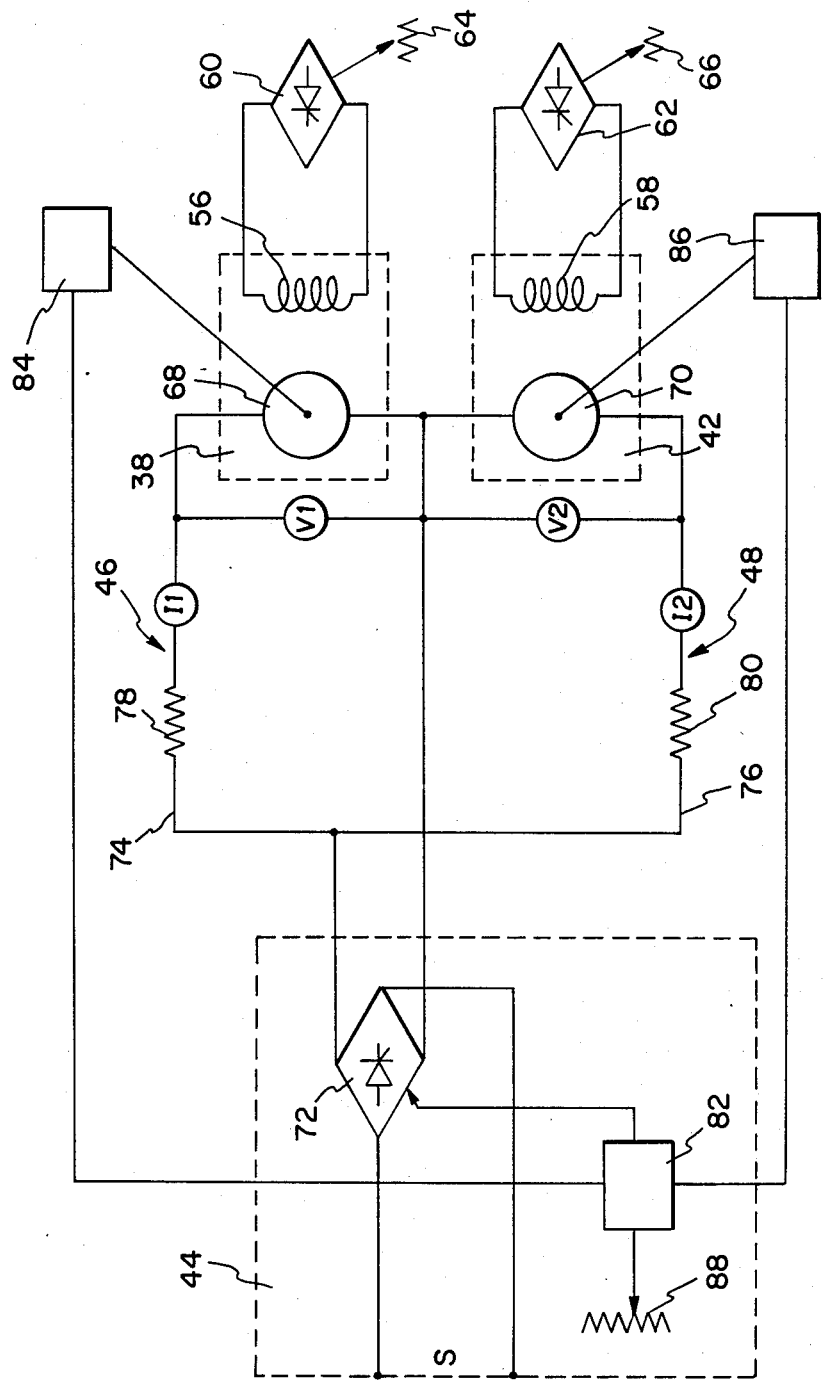
FIG. 2 is the wiring diagram of the drive mechanism of FIG. 1.

Referring to FIG. 2 it will be seen that the two direct current motors 38, 42 have separate excitation circuits, each field magnet 56, 58 being energized from a direct current electrical source, shown as a thyristor bridge 60, 62 controlled by means of an adjustable resistor 64, 66. The armature windings 68, 70 are connected to a thyristor bridge 72 of the power supply 44 by two armature circuits 74, 76 each including a series connected resistor 78, 80. The thyristors interconnected as a full wave bridge rectifier circuit are turned on by way of a control unit 82 receiving actual motor speed signals provided by tachogenerators 84, 86 coupled to the motor 38, 42 shafts and a reference speed signal provided by an adjustable resistor 88. The actual speed signals are compared to the reference speed signal in the control unit 82 which provides an output signal for turning the thyristors of the bridge circuit on-and-off in time sequence to modulate the armature voltage of the motor 38, 42 and in this way the speed. Such motor speed control systems are well known. Measuring instruments for instance voltmeters $V_1$, $V_2$ connected to the armature winding 68, 70 terminals report on the armature voltages and ammeters $I_1$, $I_2$ in series connection in the armature circuits 74, 76 display the armature currents. The field current may be measured similarly.

OPERATION

In normal operation the clutch 34 is uncoupled and the brakes 50, 52 are open. The gondolas 24 coupled to te cables 10,12 provide a junction between both cables. As long as the haulage force in the two cables 10, 12 is equal the power output of the motors 38, 42 is the same as well as the armature currents $I_1$, $I_2$. The motors 38, 42 are supplied by the same power source 44 and the resistors 78, 80 in the armature circuits are identical so that the armature voltages $V_1$, $V_2$ and the motor speeds are equal. The cables 10, 12 move in a synchronous movement preventing any staggering or slanting of the gondolas. The speed can be varied by means of the adjustable resistor 88 which controls the thyristor turn-on control unit 82.

As soon as one of the cables 10, 12, for instance cable 12, begins to delay, for instance when it slips on the drive pulley or is slightly longer, the cable in advance assures the main part of the haulage load and the armature current $I_1$ of its drive motor 38 increases. The voltage at the terminals of resistor 78 $R_1I_1$, $R_1$ being the resistance value of resistor 78, increases and provokes an armature voltage $V_1$ drop. The motor 38 speed decreases and the delayed cable will catch up with the other cable. The resistors 78, 80 thus provide a simple and safe self control which is not modified through the cable speed or cable laod. The measuring instruments $I_1$, $I_2$, $V_1$, $V_2$ display the right operation of the gondola lift.

The motors 38, 42 and the resistors 78, 80 are identical but slight differences may occur. Adjustable resistors 64, 66 are used for varying slightly the field 56, 58 excitation current and compensate these differences.

When the pulleys are braked the difference in braking torque may exceed the amount of adjustment provided by the described electrical control system. Further this system does not work when the motor power supply is interrupted. In accordance with the present invention the braking order given by the control unit 54 is transmitted to the clutch 34 to couple the shafts 30, 32. The pulleys 16, 18 become rigidly coupled and the cables 10, 12 move at the same speed.

The clutch 34 may also serve as a safety device for coupling together the two cables upon the presence of a significant unbalance or at the start up of the gondola lift.

FIG. 3 shows an alternative embodiment in which the two pulleys 16, 18 are superposed, the same brake 50 working on both pulleys and pushing the rims against each other when applying the brake so as to couple the two pulleys.

I claim:

1. An overhead cable transport installation drive system comprising:

terminals each having two end pulleys, two endless parallel suspension haulage cables passing over said end pulleys and extending along two parallel loops, two identical electric drive motors, each motor driving one of said pulleys, gondolas coupled in line to said two cable loops, an electrical power supply source for delivering current to said motors, and having a common armature supply for said two motors, control means for controlling said power supply to each said motor for maintaining substantially equal the power outputs of said two motors, said motors being direct current electric motors with separate excitation circuits, each motor having a field magnet and an armature winding, said armature winding being connected to said common armature supply of said power supply source by an armature circuit including a series connected resistor in series with the associated armature winding, said armature circuits being identically coupled in parallel across said common armature supply, said series connected resistors each being of a value for providing an IR voltage drop that increases with increasing armature current and thus directly provoking an armature voltage reduction equal to the resistor voltage drop increase and a resulting speed reduction when the power output of the associated motor increases for restoring identical power outputs of the two motors.

2. A drive system according to claim 1, said power supply source including a thyristor full wave rectifier bridge and said system comprising a tachogenerator driven by one of said motors and giving a speed output signal and a speed control unit receiving said speed output signal and delivering to the thyristors turn on signals for maintaining said speed equal to a predetermined speed value.

3. An overhead cable transport installation drive system comprising:

terminals having each two end pulleys, two endless parallel suspension haulage cables passing over said end pulleys and extending along two parallel loops, two identical electric drive motors, each motor driving one of said pulleys, gondolas coupled in line to said two cable loops, an electric power supply source for delivering current to said two motors, control means for controlling said power supply to each motor for maintaining substantially equal the power outputs of said two motors, two speed reducing gear devices each having a high speed input shaft driven by one of said motors and a low speed output shaft for driving said pulley, detachable clutch means for selectively coupling together and uncoupling the high speed input shafts of said two gear devices, and a pulley braking device having control means for controlling said braking device, said clutch means coupling together said two input shafts as soon as the braking device is operated for braking the pulleys.

* * * * *